(12) United States Patent
Norval

(10) Patent No.: US 10,983,405 B2
(45) Date of Patent: Apr. 20, 2021

(54) CONTROL COMPONENT FOR OPTOELECTRONIC DEVICE

(71) Applicant: FLEXENABLE LIMITED, Cambridge (GB)

(72) Inventor: Shane Norval, Cambridge (GB)

(73) Assignee: FLEXENBLE LIMITED, Cambridge (GB)

(*) Notice: Subject to any disclaimer, the term of this patent is extended or adjusted under 35 U.S.C. 154(b) by 0 days.

(21) Appl. No.: 16/460,003

(22) Filed: Jul. 2, 2019

(65) Prior Publication Data

US 2020/0012131 A1    Jan. 9, 2020

(30) Foreign Application Priority Data

Jul. 4, 2018 (GB) .................................. 1810979

(51) Int. Cl.
| G02F 1/1368 | (2006.01) |
| G02F 1/1362 | (2006.01) |

(52) U.S. Cl.
CPC .. G02F 1/1368 (2013.01); *G02F 2001/13685* (2013.01); *G02F 2001/136222* (2013.01)

(58) Field of Classification Search
CPC .......................................... G02F 2001/136222
See application file for complete search history.

(56) References Cited

U.S. PATENT DOCUMENTS

2007/0211206 A1* 9/2007 Iino ................... G02F 1/136209
                                                                    349/187
2017/0153519 A1   6/2017 Xu
2017/0176810 A1* 6/2017 Zhang .................. G02F 1/1333
2017/0255070 A1* 9/2017 Hao .................. G02F 1/133345
2018/0061709 A1* 3/2018 Pai ..................... H01L 21/76897
2019/0006524 A1* 1/2019 Guo ..................... H01L 27/1248

FOREIGN PATENT DOCUMENTS

| CN | 105223721 A | 1/2016 |
| CN | 105911734 A | 8/2016 |
| CN | 106908983 A | 6/2017 |
| KR | 10-2007-0051642 A | 5/2007 |
| WO | 2016/074254 A1 | 5/2016 |

OTHER PUBLICATIONS

British Search Report for corresponding GB 1810979.3, dated Dec. 12, 2018.

* cited by examiner

*Primary Examiner* — Edmond C Lau
(74) *Attorney, Agent, or Firm* — Sughrue Mion, PLLC

(57) ABSTRACT

A method, comprising: forming a patterned layer of matrix material and/or one or more patterned layers of colour filter material in situ over a support film; forming in situ over said support film a stack of layers defining electrical circuitry via which each of an array of pixel electrodes is independently addressable; wherein forming said stack of layers comprises forming in situ over said patterned layer of matrix material and/or one or more patterned layers of colour filter material at least: a patterned conductor layer defining an array of source conductors and an array of drain conductors; a layer of semiconductor channel material defining semiconductor channels between the source and drain conductors; and another patterned conductor layer defining an array of gate conductors providing gate electrodes in said channel regions.

10 Claims, 9 Drawing Sheets

CONTROL COMPONENT FOR OPTOELECTRONIC DEVICE

Figure 1:
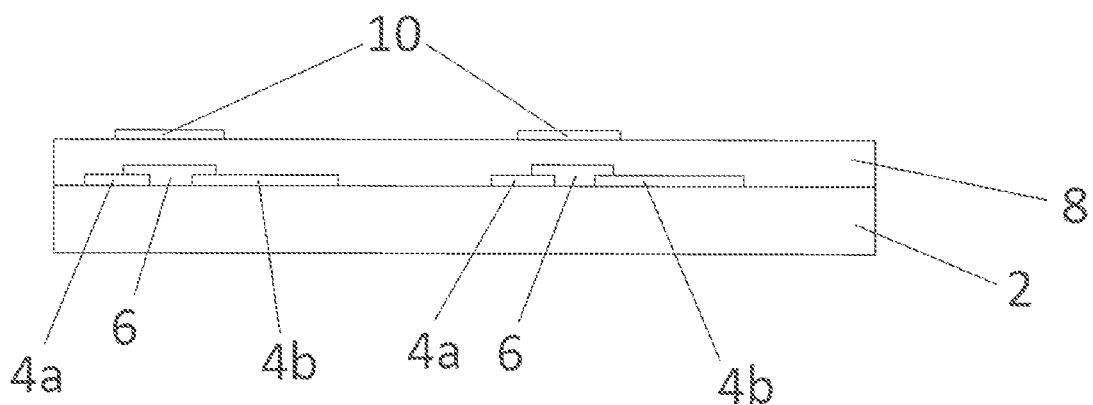

Optoelectronic devices typically comprise an array of pixel electrodes used to e.g. control the pattern of an optical output, and/or detect the pattern of an optical input.

One example of such an optoelectronic device is a liquid crystal display (LCD) device comprising liquid crystal material contained between a control component comprising an array of independently addressable pixel electrodes and a counter component. A matrix may be included within the device in regions between pixels to e.g. reduce unwanted reflections from metallic structures in regions between pixels.

Conventionally, such a matrix is included by pre-preparing a matrix component comprising a matrix pattern pre-formed on a support film (such as a plastic film), and laminating the pre-prepared matrix component to the control component including the pixel electrodes. In the case of a colour display, a pre-prepared colour filter array component comprising an array of colour filters (e.g. red, green and blue) within a matrix is laminated to the control component including the pixel electrodes.

The inventor for the present application has conducted research around providing an alternative technique of including a matrix and/or colour filters into an optoelectronic device.

There is hereby provided a method of producing a control component including an array of pixel electrodes for an optoelectronic device, the method comprising: forming a patterned layer of matrix material and/or one or more patterned layers of colour filter material in situ over a support film; forming in situ over said support film a stack of layers defining electrical circuitry via which each of the array of pixel electrodes is independently addressable; wherein forming said stack of layers comprises forming at least said array of pixel electrodes in situ over said patterned layer of matrix material and/or one or more patterned layers of colour filter material.

According to one embodiment, the method comprises: providing one or more layers of said stack of layers between said patterned layer of matrix material and/or said one or more patterned layers of colour filter material.

According to one embodiment, the method comprises: forming both said one or more patterned layers of colour filter material and said patterned layer of matrix material in situ over said support film, and said one or more patterned layers of colour filter material and said patterned layer of matrix material together define a colour filter array comprising pixels of colour filter material within a relatively non-transmissive matrix.

According to one embodiment, said one or more patterned layers of colour filter material comprise one or more patterned layers of insulating material exhibiting peak transmission at a respective wavelength in the visible spectrum.

According to one embodiment, said stack of layers includes: a patterned conductor layer defining an array of source conductors and an array of drain conductors; a layer of semiconductor channel material defining semiconductor channels in channel regions in which the source and drain conductors are in closest proximity within the patterned conductor layer; and another patterned conductor layer defining an array of gate conductors providing gate electrodes in said channel regions.

According to one embodiment, the method further comprises: forming via-holes through said colour filter material of said one or more patterned layers of colour filter material in regions of said drain conductors; and forming said array of pixel electrodes comprises forming a layer of pixel electrode material in situ over the one or more patterned layers of colour filter material, and patterning said layer of pixel electrode material so as to define said array of pixel electrodes each in contact with a respective drain conductor via a respective via-hole.

According to one embodiment, said patterned layer of matrix material includes matrix material in said channel regions.

According to one embodiment, the method further comprises: forming both said one or more patterned layers of colour filter material and said patterned layer of matrix material in situ over said support film; and providing one or more layers of said stack of layers between said patterned layer of matrix material and said one or more patterned layers of colour filter material.

According to one embodiment, said one or more layers between said patterned layer of matrix material and said one or more patterned layers of colour filter material, comprise: a patterned conductor layer defining an array of source conductors and an array of drain conductors; a layer of semiconductor channel material defining semiconductor channels in channel regions in which the source and drain conductors are in closest proximity within the patterned conductor layer; and another patterned conductor layer defining an array of gate conductors providing gate electrodes in said channel regions.

According to one embodiment, forming said patterned layer of matrix material in situ over said support film comprises: forming a continuous layer of matrix material in situ over said support film, and patterning said continuous layer of matrix material in situ over said support film.

According to one embodiment, forming a patterned layer of colour filter material in situ over said support film comprises: forming a continuous layer of colour filter material in situ over said support film, and patterning said continuous layer of colour filter material in situ over said support film.

There is also hereby provided a method of producing a display device, comprising: containing liquid crystal material between a control component produced by a method described above, and a counter component.

Embodiments of the present invention are described in detail below, by way of example only, with reference to the accompanying drawings, in which:

FIGS. 1 to 13 illustrate a process flow of one example embodiment of a technique according to the present invention; and FIGS. 14 to 25 illustrate a process flow of another example embodiment of a technique according to the present invention.

For conciseness and clarity, the drawings focus on two to three pixels of an optoelectronic device, but an optoelectronic device may comprise a very large number of pixels.

The embodiments described below are for the example of top-gate transistor arrays for fringe-field switching (FFS) LCD devices, but the techniques are also applicable to other types of transistor arrays for FFS-LCD devices, and transistor arrays for other types of devices including other types of LCD devices.

For the purposes of this document, the term "source conductor" refers to a conductor in electrical series between a driver terminal and the semiconductor channel, and the term "drain conductor" refers to a conductor in electrical series with the driver terminal via the semiconductor channel.

The semiconductor channel material may comprise one or more organic semiconductor materials (such as e.g. organic polymer semiconductors), and/or one or more inorganic semiconductor materials.

The processing of a workpiece according to example embodiments of the invention is described below with reference to the drawings. The workpiece may be temporarily secured to a more rigid carrier (not shown) during the whole of the processing, in order to e.g. maintain the workpiece in the desired configuration/position during the processing, and facilitate movement of the workpiece between processing tools.

With reference to FIGS. 1 to 13, processing of a workpiece according to a first example embodiment of the invention is described below.

A workpiece starts off as a support element 2 comprising a support film (such as a self-supporting flexible plastic film) and optionally comprising e.g. a patterned conductor layer providing a light-shielding function and a planarisation layer over the patterned conductor layer.

A continuous layer of conductor material (or stack of continuous layers comprising at least one layer of conductor material) is formed in situ on the workpiece (by e.g. a vapour deposition process such as sputtering), and patterned in situ on the workpiece to create a source-drain conductor pattern.

The source-drain conductor pattern defines at least (i) an array of source conductors 4a each associated with a respective column of transistors and extending beyond an edge of the array of pixel electrodes (mentioned below) for connection to a respective terminal of a driver chip (not shown), and (ii) an array of drain conductors 4b, each drain conductor associated with a respective transistor. Each source conductor 4a includes an addressing line that extends beyond an edge of the array of pixel electrodes for connection to a respective terminal of a driver chip, and one or more source conductor fingers for each transistor, which conductor fingers branch off from the addressing line. The source conductor fingers are the portions of the source conductor in closest proximity to the drain conductors. The drain conductor 4b includes one or more drain conductor fingers which extend in parallel to the source conductor fingers (e.g. interdigitated with the source conductor fingers), and which are the parts of the drain conductor in closest proximity to the source conductor. Each drain conductor 4b also includes a drain pad.

A continuous layer of semiconductor channel material is formed in situ on the workpiece, by e.g. a liquid deposition process such as spin-coating. The continuous layer of semiconductor channel material may be preceded by the formation on the surface of the source-drain conductor pattern of one or more layers that improve charge transfer between the source-drain conductor pattern and the semiconductor channel material, such as e.g. a self-assembled monolayer of a suitable organic material. The continuous layer of semiconductor channel material is subjected to patterning in situ on the workpiece (by e.g. a photolithographic process involving the use of a temporary patterned resist mask) to create an array of isolated islands 6 of semiconductor channel material, each island 6 providing the semiconductor channel for a respective transistor of the array.

Further processing of the workpiece continues with the formation in situ on the workpiece, in sequence, of: a (e.g. organic polymer) gate dielectric layer (or stack of gate dielectric layers) 8, by e.g. a liquid deposition process such as spin-coating; and a patterned conductor layer (or stack of conductor layers) defining at least an array of gate conductors 10, by e.g. a vapour deposition process such as sputtering. Each gate conductor is associated with a respective row of transistors and each extends beyond an edge of the array of pixel electrodes for electrical connection to a respective terminal of a driver chip. Each transistor is associated with a unique combination of gate and source conductors, whereby each pixel can be addressed independently of all other pixels.

Figure 2:
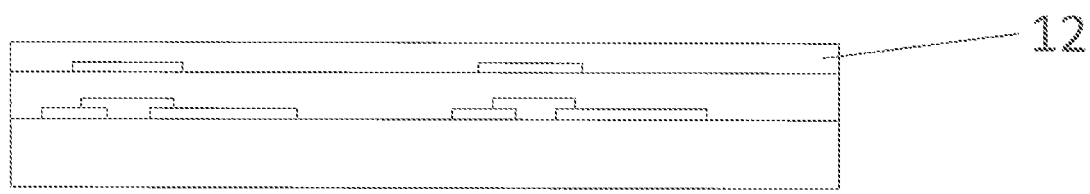
Figure 3:
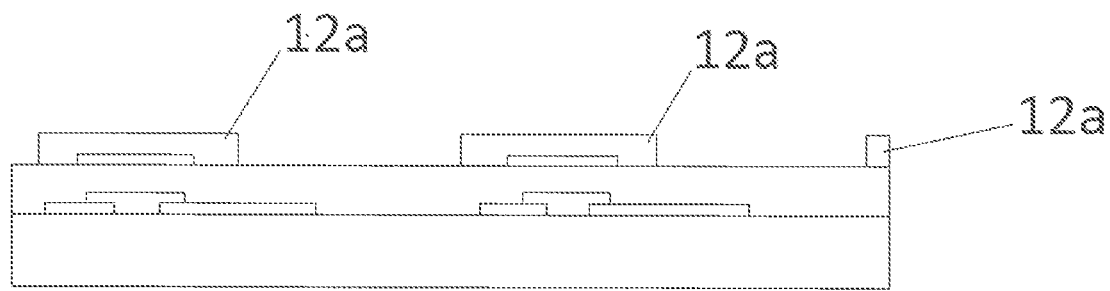

With reference to FIGS. 2 and 3, a continuous layer 12 of matrix material (e.g. substantially optically black material to provide a layer that is substantially non-transmissive and non-reflective over the whole of the visible spectrum) is formed in situ on the workpiece (by e.g. a liquid deposition process such as spin-coating), and patterned in situ on the workpiece to create a mesh-pattern of the matrix material, which functions to improve the contrast of the optical output of the product device by reducing optical leakage and light-scattering. The areas occupied by the matrix material in the mesh-pattern include the regions of the islands 6 of semiconductor channel material. The matrix material may, for example, be a black photoresist material, whose solubility decreases upon exposure to e.g. ultra-violet (UV) radiation; and the patterning may comprise exposing the continuous layer of matrix material to a positive UV image of the desired mesh pattern, to create a latent solubility image within the continuous layer of matrix material, and then developing the latent image by immersing the workpiece in e.g. the same kind of solvent that was used to form the continuous layer of matrix material.

Figure 4:
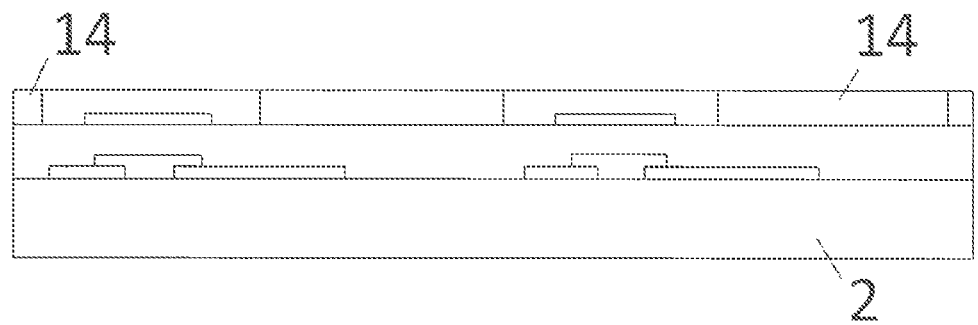
Figure 5:
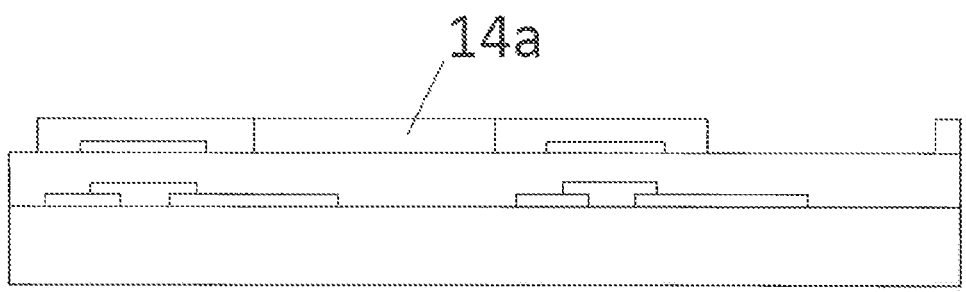

With reference to FIGS. 4 and 5, a continuous layer 14 of a first colour filter material (e.g. red filter material) is formed in situ on the workpiece (by e.g. a liquid deposition process such as spin-coating), and patterned in situ on the workpiece to create islands 14a of the red filter material in the regions of those pixels that are to be red pixels. The red filter material may be a red photoresist material, whose solubility decreases upon exposure to e.g. UV radiation; and the patterning may comprise exposing the continuous layer of red filter material to a positive UV image of the desired pattern of islands, to create a latent solubility image within the continuous layer of red filter material, and then developing the latent image by immersing the workpiece in e.g. the same kind of solvent that was used to form the continuous layer of red filter material.

Figure 6:
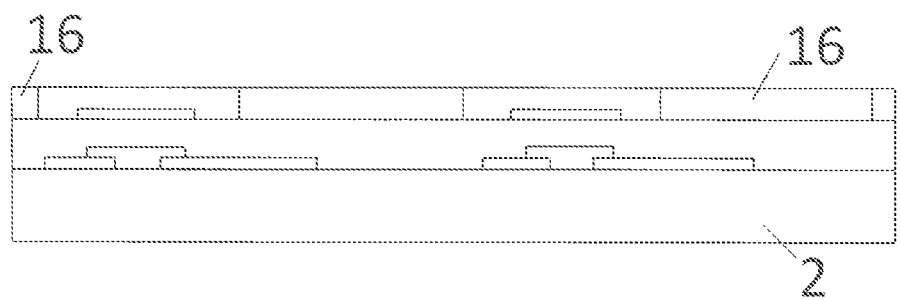
Figure 7:
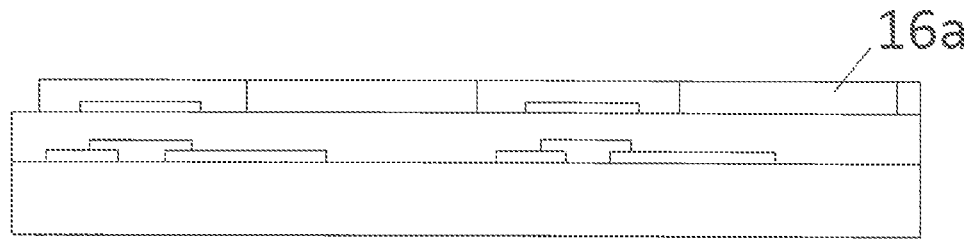

With reference to FIGS. 6 and 7, a continuous layer 16 of a second colour filter material (e.g. green filter material) is next formed in situ on the workpiece (by e.g. a liquid deposition process such as spin-coating), and patterned in situ on the workpiece to create islands 16a of the green filter material in the regions of those pixels that are to be green pixels. The green filter material may be a green photoresist material, whose solubility decreases upon exposure to e.g. UV radiation; and the patterning may comprise exposing the continuous layer 16 of green filter material to a positive UV image of the desired pattern of islands, to create a latent solubility image within the continuous layer of green filter material 16, and then developing the latent image by immersing the workpiece in e.g. the same kind of solvent that was used to form the continuous layer of green filter material.

Figure 8:
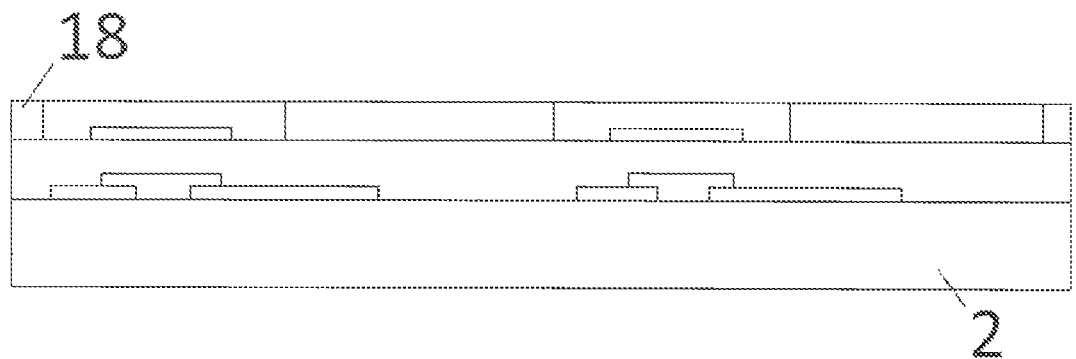
Figure 9:
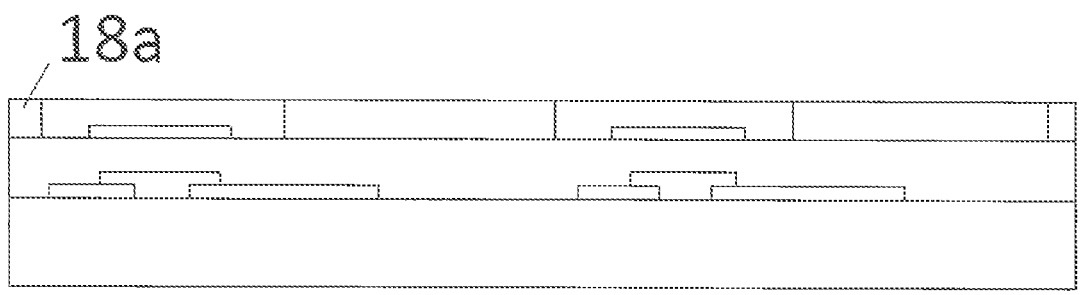

With reference to FIGS. 8 and 9, a continuous layer 18 of a third colour filter material (e.g. blue filter material) is next formed in situ on the workpiece (by e.g. a liquid deposition process such as spin-coating), and patterned in situ on the workpiece to create islands 18a of the blue filter material in the regions of those pixels that are to be blue pixels. The blue filter material may be a blue photoresist material, whose solubility decreases upon exposure to e.g. UV radiation; and the patterning may comprise exposing the continuous layer of blue filter material to a positive UV image of the desired pattern of islands, to create a latent solubility image within the continuous layer of blue filter material, and then developing the latent image by immersing the workpiece in e.g. the same kind of solvent that was used to form the continuous layer of blue filter material.

The green, red and blue filter islands may not occupy all pixels; some pixels may be left without any colour filter to create white pixels that can be used to better produce a brightness pattern in a colour pattern produced using the red, green and blue pixels.

Figure 10:
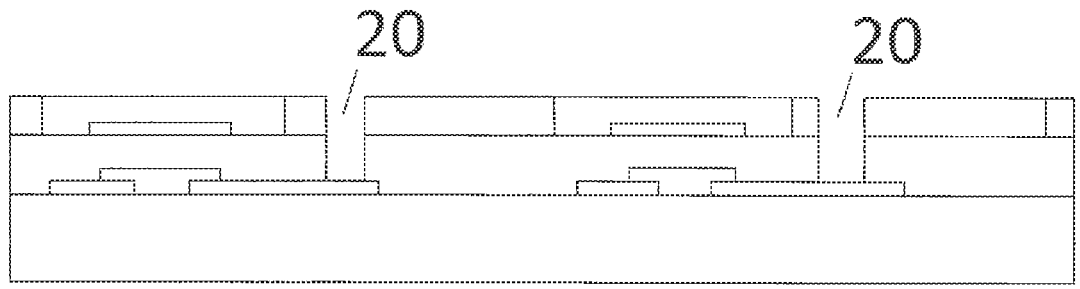
Figure 11:
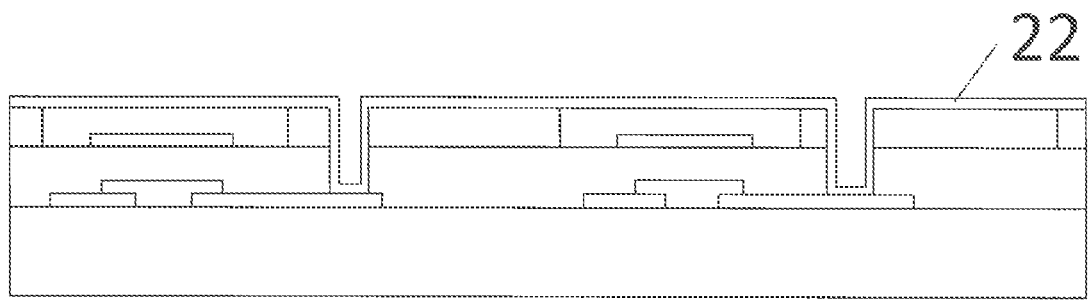
Figure 12:
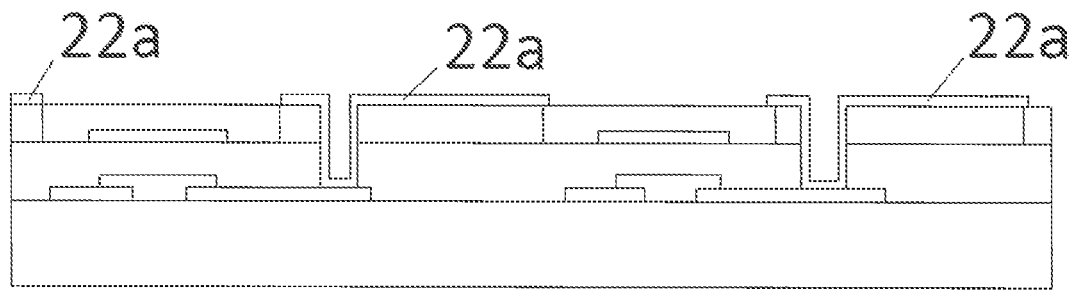

With reference to FIGS. 10 to 12: the workpiece is then subjected to a patterning process (such as a process involving forming a temporary patterned resist mask in situ on the workpiece and etching the work piece through the temporary patterned resist mask) to form via holes 20 down to each drain conductor through the islands of colour filter material 14a, 16a, 18a. A continuous layer 22 of conductor material (or a stack of continuous layers including at least one continuous layer of conductor material) is formed in situ on the workpiece (e.g. by a vapour deposition process such as sputtering), and is patterned in situ on the workpiece to form an array of pixel electrodes 22a, each in contact with a respective drain conductor 4b via a respective via-hole 20. The patterning may comprise a process involving forming a temporary patterned resist mask in situ on the workpiece and etching the work piece through the temporary patterned resist mask.

Figure 13:
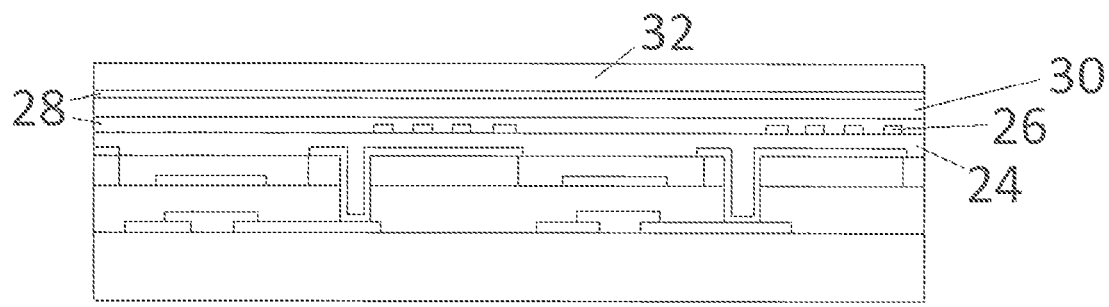

With reference to FIG. 13, further processing of the workpiece comprises: (i) forming an insulating, dielectric layer(s) 24 in situ on the workpiece (e.g. by a liquid deposition process such as spin-coating); (ii) forming a patterned conductor layer 26 in situ on the workpiece (e.g. by a vapour deposition process such as sputtering), which patterned conductor layer defines the common (COM) conductor for the FFS-LCD device; and (iii) forming an alignment layer 28 (e.g. rubbed polyimide layer) in situ on the workpiece (e.g. by a liquid deposition process such as spin-coating, and mechanical rubbing), which alignment layer controls the orientation of the liquid crystal molecules in the absence of an electric field applied via the pixel electrodes.

Also, with reference to FIG. 13, a counter component is prepared comprising another support film (e.g. self-supporting, flexible, plastic support film) and another alignment layer 28; and liquid crystal material is contained between the control component and the counter component to produce a LC cell. Spacers (not shown) are provided to better maintain a uniform thickness of liquid crystal material across all pixels.

An example of a process according to another embodiment of the invention is described hereunder with reference to FIGS. 14 to 25.

The workpiece starts off as a support element 42 comprising a support film (such as a self-supporting, flexible, plastic film) and a patterned layer 44 (e.g. metal layer) formed in situ on the support film, by e.g. a vapour deposition process such as sputtering and a patterning process involving etching the workpiece through a temporary patterned resist mask). The patterned layer 44 provides a light-shielding function in the semiconductor channel regions mentioned below.

Figure 14:
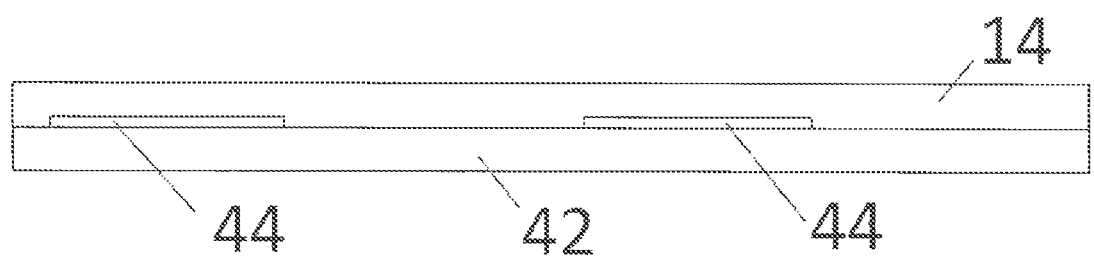
Figure 15:
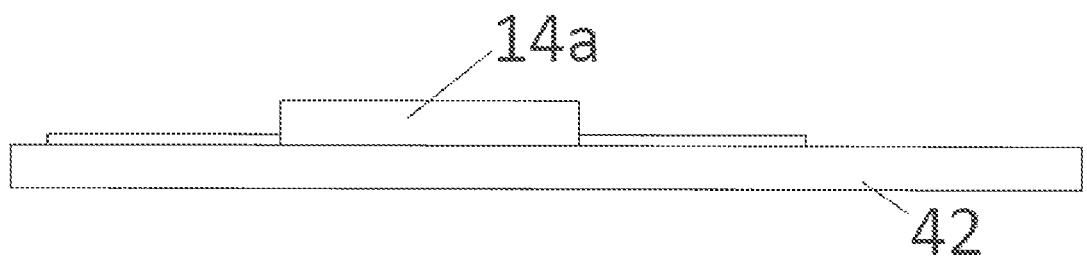

With reference to FIGS. 14 and 15, a continuous layer 14 of a first colour filter material (e.g. red filter material) is formed in situ on the workpiece (e.g. by a liquid deposition process such as spin-coating), and patterned in situ on the workpiece to create islands 14a of the red filter material in the regions of those pixels that are to be red pixels. The red filter material may be a red photoresist material, whose solubility decreases upon exposure to e.g. UV radiation; and the patterning may comprise exposing the continuous layer of red filter material to a positive UV image of the desired pattern of islands, to create a latent solubility image within the continuous layer of red filter material, and then developing the latent image by immersing the workpiece in e.g. the same kind of solvent that was used to form the continuous layer of red filter material.

Figure 16:
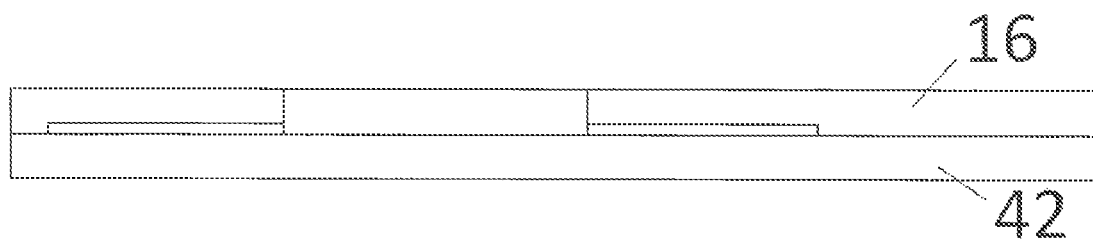
Figure 17:
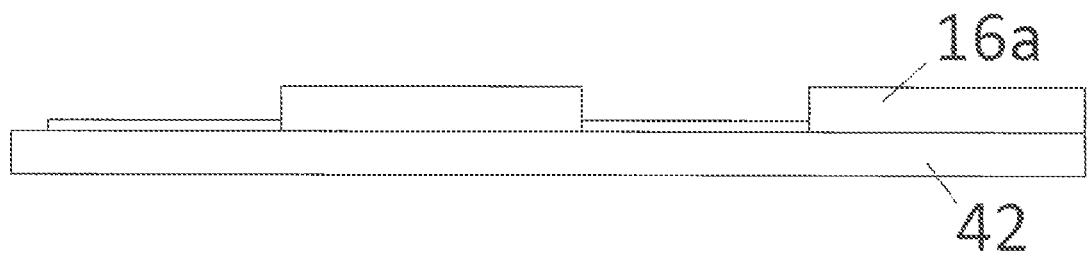

With reference to FIGS. 16 and 17, a continuous layer 16 of a second colour filter material (e.g. green filter material) is next formed in situ on the workpiece (e.g. by a liquid deposition process such as spin-coating), and patterned in situ on the workpiece to create islands 16a of the green filter material in the regions of those pixels that are to be green pixels. The green filter material may be a green photoresist material, whose solubility decreases upon exposure to e.g. UV radiation; and the patterning may comprise exposing the continuous layer 16 of green filter material to a positive UV image of the desired pattern of islands, to create a latent solubility image within the continuous layer of green filter material 16, and then developing the latent image by immersing the workpiece in e.g. the same kind of solvent that was used to form the continuous layer of green filter material.

Figure 18:
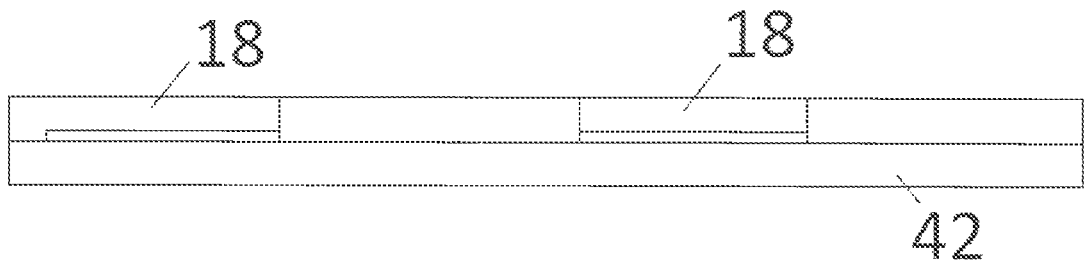
Figure 19:
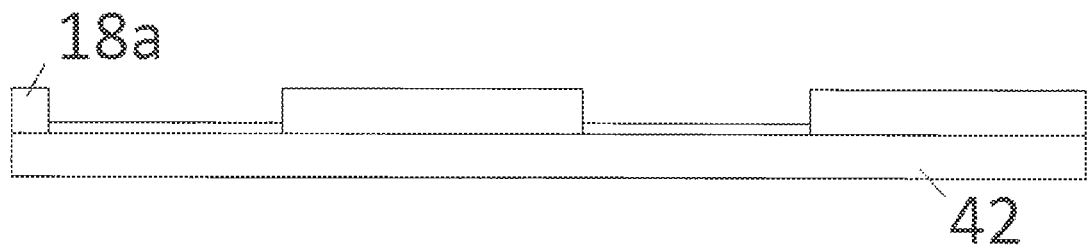

With reference to FIGS. 18 and 19, a continuous layer 18 of a third colour filter material (e.g. blue filter material) is next formed in situ on the workpiece (e.g. by a liquid deposition process such as spin-coating), and patterned in situ on the workpiece to create islands 18a of the blue filter material in the regions of those pixels that are to be blue pixels. The blue filter material may be a blue photoresist material, whose solubility decreases upon exposure to e.g. UV radiation; and the patterning may comprise exposing the continuous layer of blue filter material to a UV image of the desired pattern of islands, to create a latent solubility image within the continuous layer of blue filter material, and then developing the latent image by immersing the workpiece in e.g. the same kind of solvent that was used to form the continuous layer of blue filter material.

The green, red and blue filter islands 14a, 16a, 18a may not occupy all pixels; some pixels may be left without any colour filter to create white pixels that can be used to better produce a brightness pattern in a colour pattern produced using the red, green and blue pixels.

Figure 20:
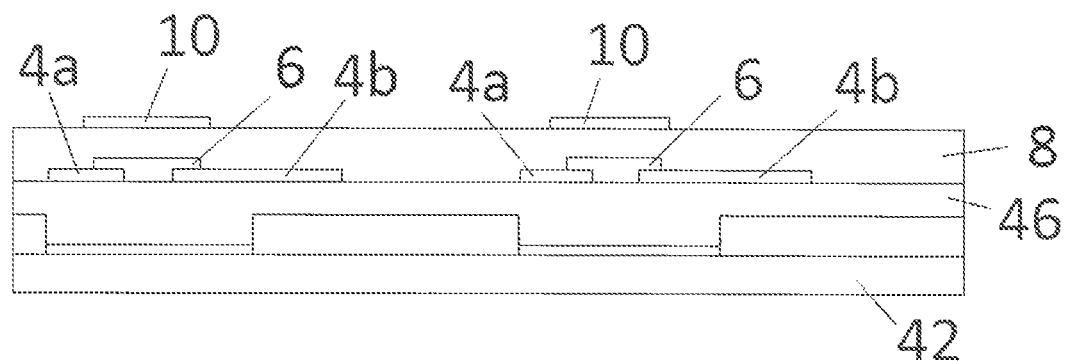

With reference to FIG. 20, a planarisation layer 46 is formed in situ on the workpiece (e.g. by a liquid deposition process such as spin-coating) to create a planarised surface for further processing of the workpiece. A continuous layer of conductor material (or stack of continuous layers comprising at least one layer of conductor material) is formed in situ on the workpiece (e.g. by a vapour deposition process such as sputtering), and the continuous layer(s) is patterned in situ on the workpiece to create a source-drain conductor pattern. The patterning process may comprise etching the workpiece through a temporary patterned resist mask.

The source-drain conductor pattern defines at least (i) an array of source conductors 4a each associated with a respective column of transistors and extending beyond an edge of the pixel electrode array (mentioned below) for connection to a respective terminal of a driver chip (not shown), and (ii) an array of drain conductors 4b, each drain conductor associated with a respective transistor. Each source conductor 4a includes an addressing line that extends beyond an edge of the pixel electrode array for connection to a respective terminal of a driver chip, and one or more source conductor fingers for each transistor, which conductor fingers branch off from the addressing line. The source conductor fingers are the portions of the source conductor in closest proximity to the drain conductors. The drain conductor 4b includes one or more drain conductor fingers which extend in parallel to the source conductor fingers (e.g. interdigitated with the source conductor fingers), and which are the parts of the drain conductor in closest proximity to the source conductor. Each drain conductor 4b also includes a drain pad.

A continuous layer of semiconductor channel material is formed in situ on the workpiece (e.g. by a liquid deposition process such as spin-coating). The continuous layer of semiconductor channel material may be preceded by the formation on the surface of the source-drain conductor pattern of one or more layers that improve charge transfer between the source-drain conductor pattern and the semiconductor channel material, such as e.g. a self-assembled monolayer of a suitable organic material. The continuous layer of semiconductor channel material is subjected to patterning in situ on the workpiece (e.g. by etching the workpiece through a temporary, patterned resist mask) to create an array of isolated islands 6 of semiconductor channel material, each island 6 providing the semiconductor channel for a respective transistor of the array.

Further processing of the workpiece continues with the formation in situ on the workpiece, in sequence, of: a (e.g. organic polymer) gate dielectric layer (or stack of gate dielectric layers) 8 by e.g. a liquid deposition process such as spin-coating; and a patterned conductor layer (or stack of conductor layers) defining at least an array of gate conductors 10, by e.g. a vapour deposition process such as sputtering. Each gate conductor is associated with a respective row of transistors and each extends beyond an edge of the pixel electrode array for electrical connection to a respective terminal of a driver chip. Each transistor is associated with a unique combination of gate and source conductors, whereby each pixel can be addressed independently of all other pixels.

Figure 21:
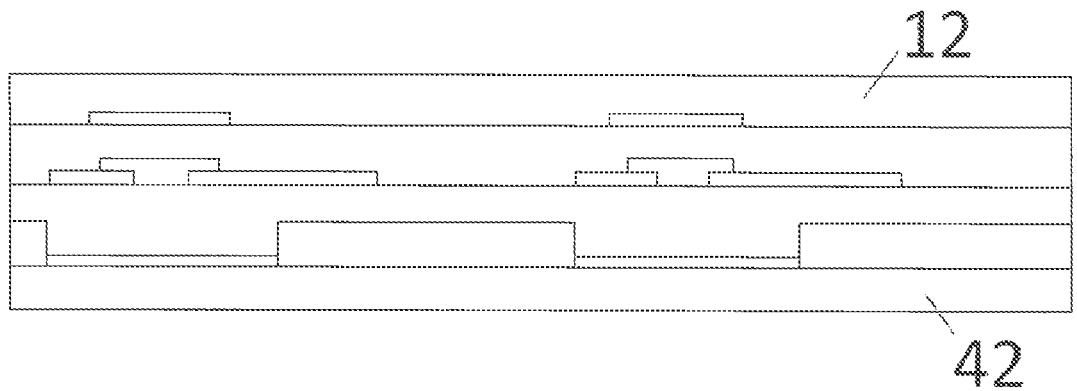
Figure 22:
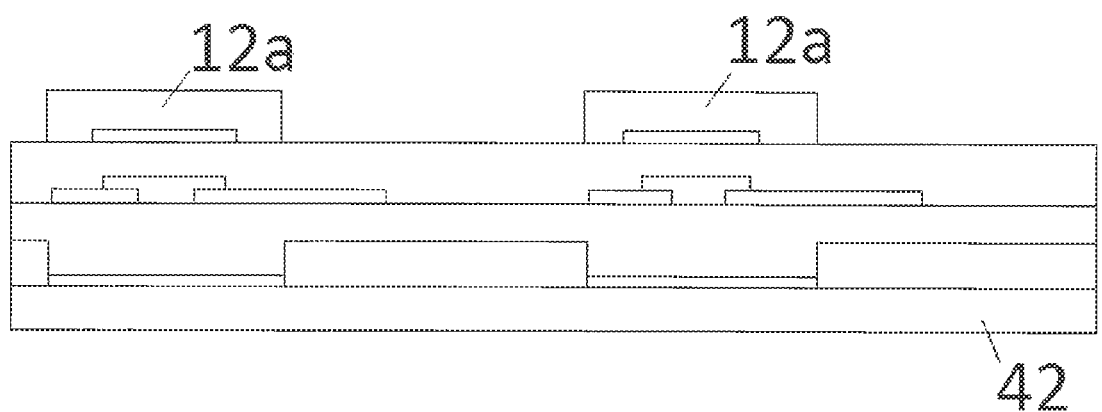

With reference to FIGS. 21 and 22, a continuous layer 12 of matrix material (e.g. optically substantially black material to provide a layer that is substantially non-transmissive and non-reflective over the whole of the visible spectrum) is formed in situ on the workpiece (by e.g. a liquid deposition process such as spin-coating), and patterned in situ on the workpiece to create a mesh-pattern of the matrix material, which functions to improve the contrast of the optical output of the product device by reducing optical leakage and light-scattering. The areas occupied by the matrix material in the mesh-pattern include the regions of the islands 6 of semiconductor channel material. The matrix material may, for example, be a black photoresist material, whose solubility decreases upon exposure to e.g. ultra-violet (UV) radiation; and the patterning may comprise exposing the continuous layer of matrix material to a positive UV image of the desired mesh pattern, to create a latent solubility image within the continuous layer of matrix material, and then developing the latent image by immersing the workpiece in e.g. the same kind of solvent that was used to form the continuous layer of matrix material.

Figure 23:
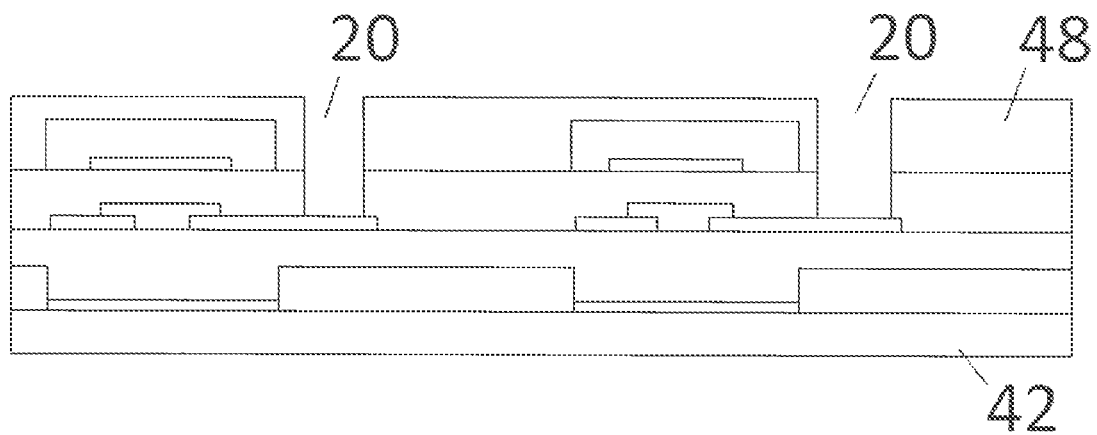

With reference to FIG. 23, a layer(s) 48 of insulating material is formed in situ on the workpiece (e.g. by a liquid deposition process such as spin-coating), and the workpiece is then subjected to a patterning process to form via holes 20 down to each drain conductor. This patterning may comprise etching the workpiece through a temporary, patterned resist mask.

Figure 24:
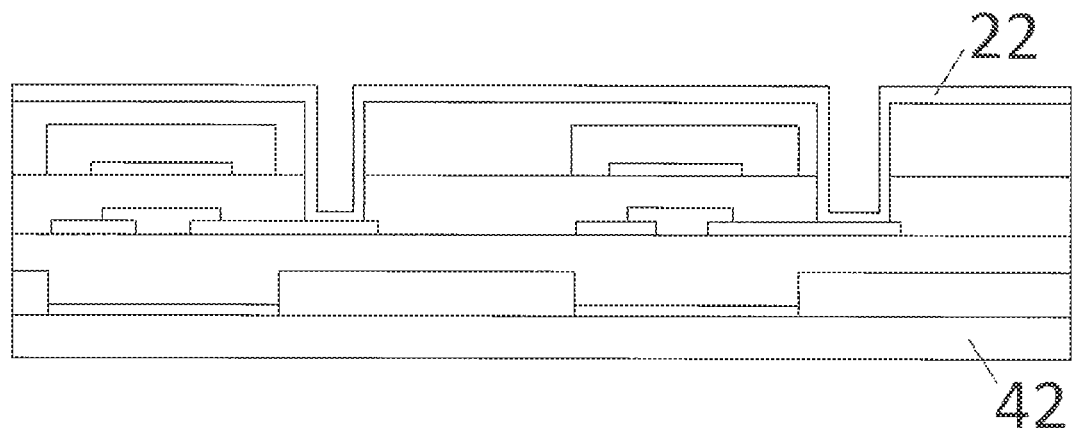
Figure 25:
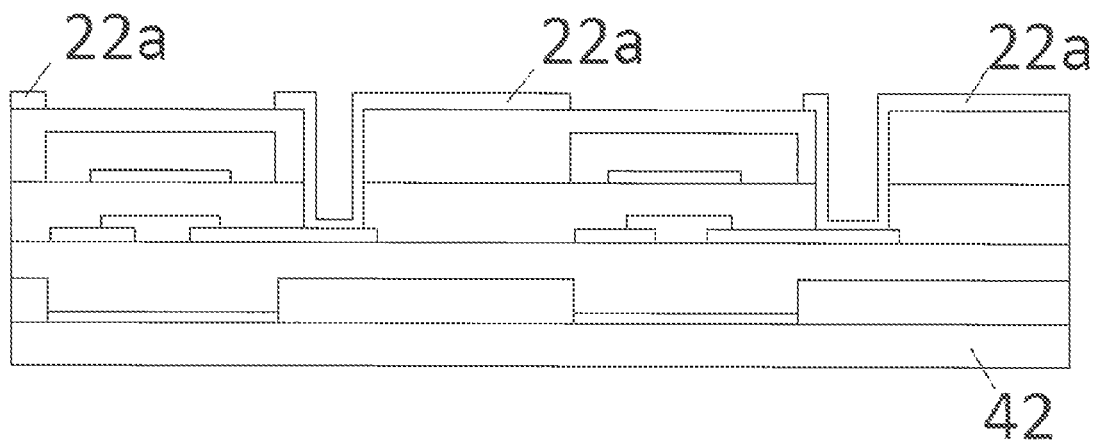

With reference to FIGS. 24 and 25, a continuous layer 22 of conductor material (or a stack of continuous layers including at least one continuous layer of conductor material) is formed in situ on the workpiece (by e.g. a vapour deposition process such as sputtering), and is patterned in situ on the workpiece to form an array of pixel electrodes 22a, each in contact with a respective drain conductor 4b via a respective via-hole 20. This patterning may also comprise etching the workpiece through a temporary, patterned resist mask.

The workpiece is then further processed in the same way as the first embodiment, and the resulting control component is incorporated into a LC cell in the same way as the first embodiment.

The embodiments described above are, for example, particularly useful for producing devices to be flexed into curved configurations. The techniques better ensure the maintenance of good alignment between the pixel electrode/source-conductor patterns and the colour filter pattern when the device is flexed into a curved configuration. The techniques also better ensure good alignment between the pixel electrode/source-conductor patterns and the colour filter pattern when using plastic support films that unavoidably undergo distortion (expansion and contraction) during processing that involves heat cycles.

Example embodiments of the invention are described above in the context of display devices, but the same techniques are also applicable to production of other devices comprising an array of pixel electrodes, such as sensor devices. For example, a black matrix in a sensor device can improve signal to noise ratio.

In addition to any modifications explicitly mentioned above, it will be evident to a person skilled in the art that various other modifications of the described embodiment may be made within the scope of the invention.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

The invention claimed is:
1. A method, comprising:
   forming a patterned layer of matrix material and one or more patterned layers of colour filter material in situ over a support film;
   forming in situ over said support film a stack of layers defining electrical circuitry via which each of an array of pixel electrodes is independently addressable;
   wherein forming said stack of layers comprises providing one or more layers of said stack of layers between said patterned layer of matrix material and said one or more patterned layers of colour filter material; and further comprising:
   forming a patterned metal light-shielding layer over the support film, and forming the one or more patterned layers of colour filter material, the stack of layers, and the patterned layer of matrix material over the patterned metal light-shielding layer.

2. The method according to claim 1, wherein said one or more layers between said patterned layer of matrix material and said one or more patterned layers of colour filter material, comprise:
a patterned conductor layer defining an array of source conductors and an array of drain conductors; a layer of semiconductor channel material defining semiconductor channels in channel regions in which the source and drain conductors are in closest proximity within the patterned conductor layer; and
another patterned conductor layer defining an array of gate conductors providing gate electrodes in said channel regions.

3. The method according to claim 1, wherein forming said patterned layer of matrix material in situ over said support film comprises forming a continuous layer of matrix material in situ over said support film, and patterning said continuous layer of matrix material in situ over said support film.

4. The method according to claim 1, wherein forming a patterned layer of colour filter material in situ over said support film comprises forming a continuous layer of colour filter material in situ over said support film, and patterning said continuous layer of colour filter material in situ over said support film.

5. The method according to claim 1, further comprising: containing liquid crystal material between said array of pixel electrodes and a counter component.

6. The method according to claim 1, wherein the matrix material comprises a substantially optically black material.

7. The method according to claim 1, wherein the matrix material is substantially non-transmissive and non-reflective over the whole of the visible spectrum.

8. The method according to claim 1, wherein the patterned layer of matrix material comprises a mesh pattern.

9. A method, comprising:
forming in situ over a support film one of (a) a patterned layer of matrix material and (b) one or more patterned layers of colour filter material;
after forming the one of (a) patterned layer of matrix material and (b) the one or more patterned layers of colour filter material, forming in situ over the support film one or more layers of a stack of layers defining electrical circuitry via which each of an array of pixel electrodes is independently addressable;
after forming the one or more layers of the stack of layers, forming in situ over the support film the other of (a) a patterned layer of matrix material and (b) one or more patterned layers of colour filter material; and further comprising:
forming the one or more patterned layers of colour filter material before forming the one or more layers of the stack of layers, and
forming the patterned layer of black matrix material after forming the one or more layers of the stack of layers.

10. A method, comprising:
forming in situ over a support film one of (a) a patterned layer of matrix material and (b) one or more patterned layers of colour filter material;
after forming the one of (a) patterned layer of matrix material and (b) the one or more patterned layers of colour filter material, forming in situ over the support film one or more layers of a stack of layers defining electrical circuitry via which each of an array of pixel electrodes is independently addressable;
after forming the one or more layers of the stack of layers, forming in situ over the support film the other of (a) a patterned layer of matrix material and (b) one or more patterned layers of colour filter material; and further comprising:
forming a light-shielding layer over the support film before forming the one or more patterned layers of colour filter material, the stack of layers, and the patterned layer of black matrix material;
wherein the light-shielding layer comprises a patterned metal layer.

* * * * *